United States Patent [19]

Fukino et al.

[11] 4,382,671
[45] May 10, 1983

[54] SIGNAL TRANSMISSION DEVICE IN AN INTERMEDIATE LENS BARREL

[75] Inventors: Kunihiro Fukino; Yukio Saito; Yoshiharu Shiokama, all of Kawasaki, Japan

[73] Assignee: Nippon Kogaku K.K., Tokyo, Japan

[21] Appl. No.: 315,518

[22] Filed: Oct. 27, 1981

[30] Foreign Application Priority Data

Oct. 30, 1980 [JP] Japan .......................... 55-154139[U]

[51] Int. Cl.³ ............................................. G03B 17/14
[52] U.S. Cl. ................,............................... 354/286
[58] Field of Search ................................... 354/46, 286

[56] References Cited

U.S. PATENT DOCUMENTS 3,683,765 8/1972 Iura ....................................... 354/46
4,003,068 1/1977 Hashimoto et al. ................. 354/286
4,269,497 5/1981 Ishizaka et al. ..................... 354/286
4,314,752 2/1982 Ishizaka et al. ..................... 354/286

Primary Examiner—L. T. Hix
Assistant Examiner—Alan Mathews
Attorney, Agent, or Firm—Fitzpatrick, Cella, Harper & Scinto

[57] ABSTRACT

Signal transmission device in an intermediate lens barrel comprises a signal surface, a first inclined surface and a second inclined surface. When the intermediate lens barrel is connected to an objective lens, the signal surface gets in engagement with a signal member on the objective lens barrel and is shifted in the direction of the optical axis. When the intermediate lens barrel is rotated to connect it to a camera, a signal detection member on the camera is guided to the signal surface by the first inclined surface. The second inclined surface guides the detection member to a reference surface on the intermediate lens barrel when the latter is rotated in the direction to disconnect the barrel from the camera.

4 Claims, 14 Drawing Figures

SIGNAL TRANSMISSION DEVICE IN AN INTERMEDIATE LENS BARREL

BACKGROUND OF THE INVENTION

1. Field of the Invention

The present invention relates to an intermediate lens barrel to be mounted between an objective lens barrel and a camera. In particular, the present invention relates to such intermediate lens barrel provided with means for transmitting a signal from the objective lens barrel to the camera.

2. Description of the Prior Art

There is known and used in the art an objective lens barrel which is provided with signal means indicative of information specific to the objective lens such as its minimum F-number or focal length. Said signal means is provided on a mount formed on the lens barrel for connecting the lens barrel to a camera. For example, mention is made of U.S. Pat. No. 4,269,497. In the lens barrel disclosed therein, a groove is formed on the mount. The groove has a particularly determined depth in the direction of the optical axis. The groove depth is indicative of the above mentioned information of the objective lens. When the lens barrel is mounted on a camera, a movable and projectable pin provided on the mount of the camera is shifted corresponding to the depth of the groove on the lens barrel. Thus, information is transmitted from the lens barrel to the camera. Mounting of the objective lens barrel on a camera and demounting it from the camera is effected by means of a known bayonet mount mechanism. Therefore, the lens barrel must be rotated about the optical axis by a determined angle relative to the mount of the camera for mounting or for demounting. To assure an easy engagement of the pin in the groove or an easy disengagement of the pin from the groove during the rotation for mounting or demounting, the groove is tapered in the circumferential direction of the lens barrel. An intermediate lens barrel to be mounted in between such objective lens barrel and camera is therefore required to have a device for transmitting the information of the objective lens barrel to the camera.

For such signal transmission device it is required to be able to smoothly engage with the movable pin projecting from the camera not only when the intermediate lens barrel is mounted on the camera after connecting the objective lens barrel with the intermediate lens barrel but also when the intermediate lens barrel is mounted on the camera before connecting the objective lens barrel to the intermediate lens barrel.

SUMMARY OF THE INVENTION

Accordingly, it is an object of the invention to improve a signal transmission device used in an intermediate lens barrel to be mounted between the above mentioned type of objective lens barrel and a camera for transmitting information from signal means provided on the mount of the objective lens to the camera.

The intermediate lens barrel according to the invention includes a conversion lens provided with a lens system for producing a composite focal length converted relative to the focal length specific to the objective lens by the combination of the intermediate lens barrel and the objective lens or an intermediate ring without such lens system. The intermediate lens according to the invention has a first mount for connecting it with the mount of the objective lens barrel and a second mount for connecting it with the camera.

The information to be transmitted through the signal transmission device according to the invention is represented by signal means provided on the mount of the objective lens barrel. Said signal means has a recess or projection of a certain determined height relative to a reference surface in the direction of the optical axis. The information is transmitted to a detection pin provided on the mount of the camera. The detection pin is disposed projecting from the mount of the camera in the direction of the optical axis and retractable into the mount.

The transmission device of the invention comprises a transmission member movable in the direction of the optical axis and having two ends one of which is connectable with said signal means and the other is connectable with the detection pin. The first end of the transmission member can be moved projecting beyond the reference surface of the first mount in the direction of the optical axis and the second end can be exposed on the reference surface of the second mount. The second end of the transmission member has a signal surface which can come into contact with the detection pin on the camera when the mounting of the intermediate lens barrel on the camera is completed, and an inclined surface for guiding the detection pin onto the signal surface during the operation of the above rotation for mounting. The second mount has another inclined surface formed thereon in opposition to the above inclined surface.

Other and further objects, features and advantages of the invention will appear more fully from the following description of preferred embodiments with reference to the accompanying drawings.

DESCRIPTION OF PREFERRED EMBODIMENTS

Figure 1:
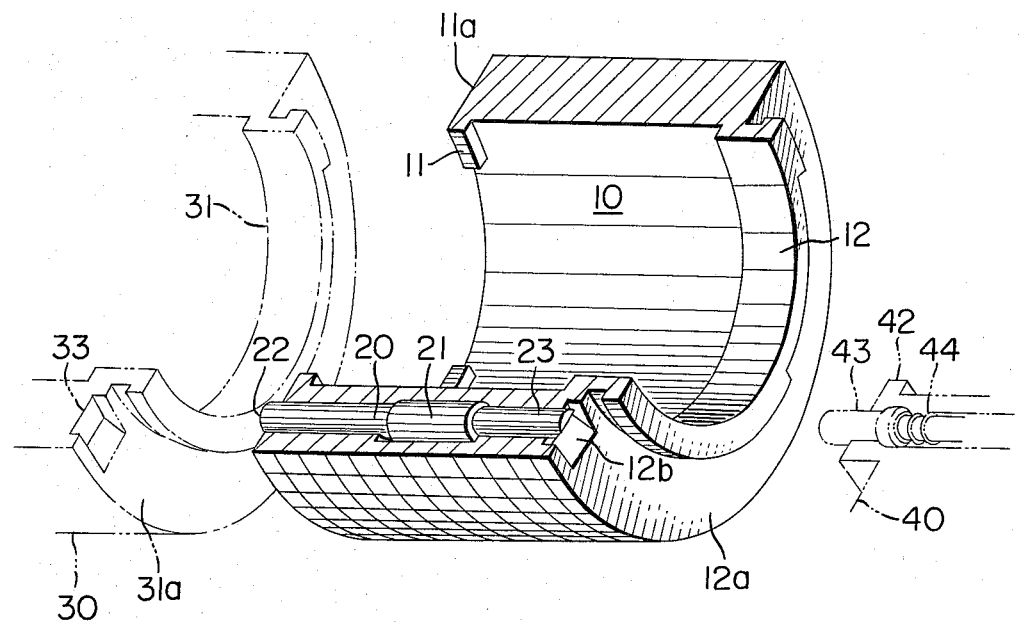
FIG. 1 is a partially cutaway perspective view of an embodiment of the present invention.

Referring first to FIG. 1, the intermediate lens barrel according to the invention is generally designated by 10. The intermediate lens barrel 10 has a signal transmission rod member 20 provided on it and arranged to slide in the direction of the optical axis. The intermediate lens barrel 10 has also two mount portions, that is, a first mount 11 engageable with a mount 31 of an objective lens tube 30 and a second mount 12 engageable with a mount 42 of a camera 40. Connection between the mounts 31 and 11 is established by rotating the objective lens barrel relative to the intermediate lens barrel 10 counter-clockwise in a certain amount of rotation about the optical axis. Connection between the mounts 12 and 42 is established by rotating the intermediate lens barrel 10 relative to the camera 40 also counter-clockwise in a certain amount of rotation about the optical axis.

The signal transmission member 20 is received in a pass-through hole extending from a reference surface 11a of the first mount to a reference surface 12a of the second mount. The slide movement of the transmission member 20 in the direction of the optical axis is limited by a flange member 21 formed on the central area of the transmission member 20. For preventing the rotation of the transmission member relative to the intermediate lens barrel, stop means, not shown, is provided.

On a reference surface 31a of the mount 31 of the objective lens barrel 30 there is provided a groove 33 having a particularly determined depth indicative of information specific to the lens. When the connection between the mounts 31 and 11 is completed, one end 22 of the signal transmission member 20 is opposed to the groove 33. The other end 23 of the signal transmission member 20 is opposed to a detection pin 43 on the mount 42 of the camera when the connection between the mounts 12 and 42 is completed. The detection pin 43 is normally projected from the mount 42 of the camera under the biasing force of a spring 44. The detection pin 43 is retractable into the mount 42 against the force of the spring 44.

Figure 2:
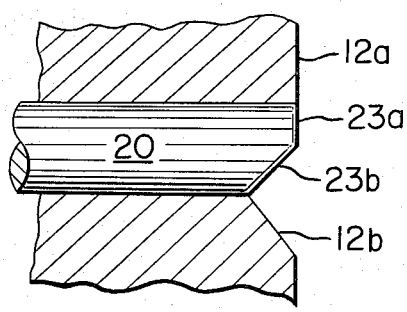
FIG. 2 is an enlarged view of the essential part thereof.

As shown in FIG. 2, the other end 23 of the signal transmission member 20 comprises a signal surface 23a and an inclined surface 23b. These surfaces are used to transmit information to the detection pin 43 in the manner described hereinafter. In opposition to the inclined surface 23b there is formed on the reference surface 12a another inclined surface 12b sloping down toward the pass-through hole from the reference surface 12a.

FIGS. 3A to 5C illustrate the manner of operation of the signal transmission member 20 during the time of the intermediate lens barrel being mounted on the camera after completing the mounting of the objective lens barrel on the intermediate lens barrel.

Figure 3A:
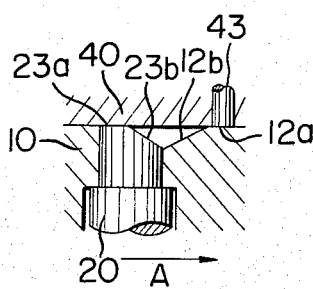
FIGS. 3A–3C, FIGS. 4A–4C and FIGS. 5A–5C are sectional views illustrating the manner of operation of the embodiment.
Figure 3B:
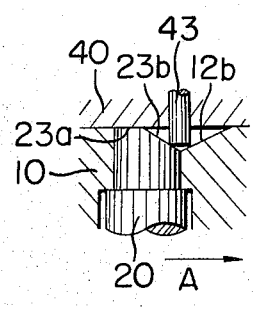
Figure 3C:
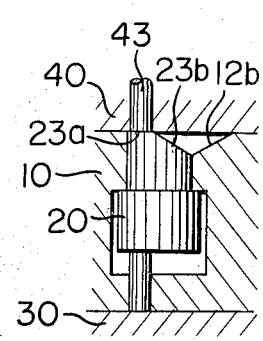
Figure 4A:
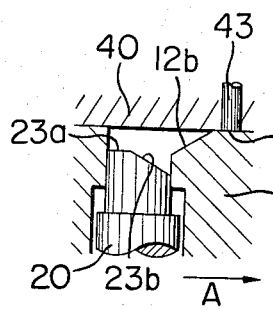
Figure 4B:
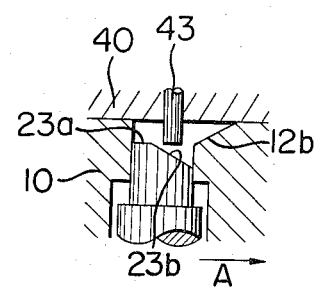
Figure 4C:
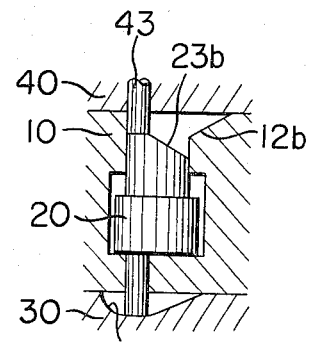
Figure 5A:
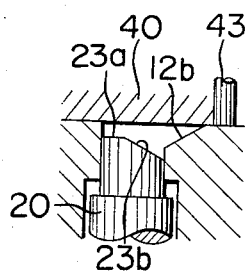
Figure 5B:
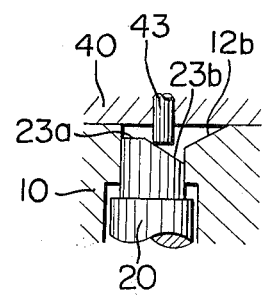
Figure 5C:
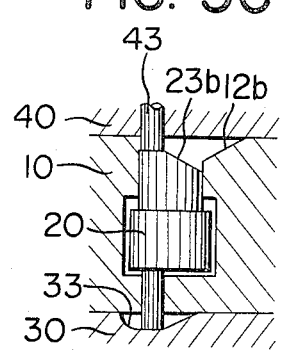

FIGS. 3A through 3C illustrate the manner of operation of the signal transmission member for such objective lens barrel which is provided with no signal means or has a groove 33 the depth of which lies in the same plane as the reference surface 31a of the lens barrel. FIGS. 4A through 4C illustrate the manner of operation for the maximum signal, namely, for an objective lens barrel having a groove 33 whose depth from the reference surface 31a is the largest of all. FIGS. 5A through 5C illustrate the manner of operation for the case wherein the amount of signal is at an intermediate level between the above two cases.

In each case of FIGS. 3A-3C, 4A-4C and 5A-5C the intermediate lens barrel 10 reaches the final position shown in FIGS. 3C, 4C or 5C through the phases shown in FIGS. 3A-3B; 4A-4B or 5A-5C. In the final position, the intermediate lens barrel 10 is completely mounted on the camera 40 by means of a positioning pin for lens mounting (not shown).

More concretely, in the case of FIGS. 3A-3C, the second mount of the intermediate lens barrel is pressed against the mount of the camera at first. The detection pin 43 on the camera is moved back by the reference surface 12a of the second mount. FIG. 3A shows this position. From the position shown in FIG. 3A, the intermediate lens barrel is rotated in the direction of arrow A. In the first phase of this rotation, the detection pin 43 slides down along the inclined surface 12b and comes into contact with the inclined surface 23b as shown in FIG. 3B. With a further rotation of the intermediate lens barrel, the pin 43 slides up along the inclined surface 23b and comes in contact with the signal surface 23a as shown in FIG. 3C. In this position, the determined amount of signal of the objective lens is transmitted to the camera 40 correctly.

When the intermediate lens barrel is detached from the camera, the above steps are reversed. At first, the pin 43 is driven to move from the signal surface 23a to the inclined surface 23b. Then, the pin slides down along the inclined surface 23a and slides up along the inclined surface 12b smoothly into the reference surface 12a. The intermediate lens barrel gets detached from the camera after a certain amount of slide movement of the pin along the reference surface 12a.

In the case of FIGS. 4A-4C, the signal surface 23a is most distant from the reference surface 12a downwards. Similarly, the pin 43 slides down along the inclined surface 12b. But, as the pin is allowed to project beyond the reference surface 12a only in a limited amount, after sliding down along the inclined surface 12b, the pin gets in the position shown in FIG. 4B in which the pin 43 can not contact with any surface. After a further rotation of the intermediate lens barrel, the pin comes into contact with the signal surface 23a as shown in FIG. 4C.

In the case of FIGS. 5A-5C, the mounting operation is performed in a composite form of the above two operations. In the final position shown in FIG. 5C, the signal given by the groove 33 of the objective lens 30 is transmitted to the camera through the intermediate lens barrel.

Figure 6A:
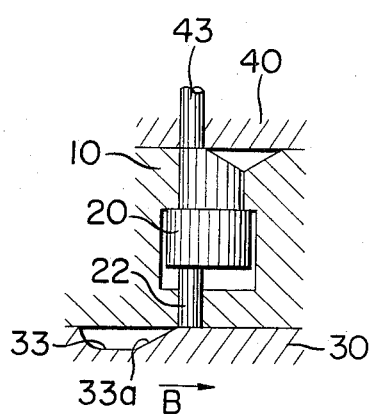
FIGS. 6A and 6B also illustrate the manner of operation of the same embodiment.
Figure 6B:
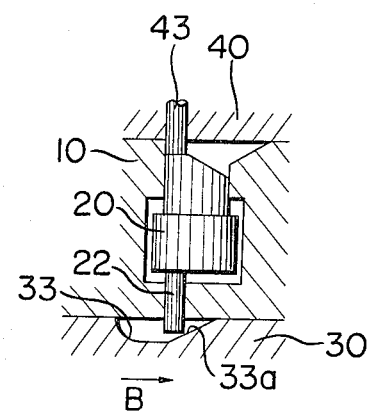

If an objective lens barrel is mounted on the first mount of the intermediate lens barrel after mounting the intermediate lens barrel on a camera, then the mounting operation proceeds in the manner shown in FIGS. 6A and 6B.

The objective lens barrel 30 is at first pressed against the first mount of the intermediate lens barrel. By this pressure, the signal transmission member 20 and the pin 43 are together moved back to the position shown in FIG. 6A. By rotating the lens in the direction of arrow B from the position shown in FIG. 6A one end 22 of the transmission member slides down along the inclined surface 33a of the groove 33 as shown in FIG. 6B. The end 22 of the transmission member finally reaches the bottom of the groove 33. Thus, a signal of the lens is transmitted to the camera.

Figure 7:
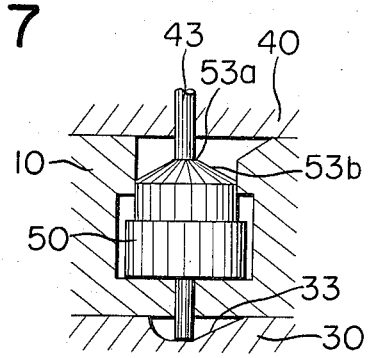
FIG. 7 is a sectional view of another embodiment of the invention.

FIG. 7 shows another embodiment of the invention.

In this embodiment, the signal transmission member 50 has a signal surface 53a for transmitting a signal to the detection pin 43 on the camera and a conically inclined surface 53b surrounding the signal surface 53a. According to the embodiment, it is no longer necessary to limit the rotation of the transmission member 50.

If the focal length of an objective lens is changed by mounting of the intermediate lens barrel, a signal corrected corresponding to the change of the focal length can be transmitted to the camera employing the technique disclosed in now U.S. Pat. No. 4,314,752.

We claim:

1. In an intermediate lens barrel to be connected between an objective lens and a camera and provided with a device for transmitting an information signal given by signal means provided on said objective lens to detection means provided on said camera movably in the direction of the optical axis, said signal means being so formed as to represent the information signal as a certain determined amount of displacement in the direction of the optical axis and said intermediate lens barrel including a reference surface rotatable together with said signal transmission device relative to said camera in a determined rotational direction and also in the reverse rotational direction about the optical axis to connect the intermediate lens barrel with said camera and disconnect said barrel from said camera, an improvement in said transmission device comprising:

(a) movable means including a signal surface which shifts in the direction of the optical axis during the connection of said intermediate lens barrel to said objective lens depending on said determined displacement of said signal means resulting from the connection between said movable means and signal means, and a first inclined surface contiguous to said signal surface and inclined in the direction of the optical axis for guiding said detection means to said signal surface with the rotation for connection; and (b) a second inclined surface contiguous to said reference surface and disposed adjacent to said first inclined surface for guiding said detection means onto said reference surface with the rotation for disconnection.

2. A signal transmission device in an intermediate lens barrel as set forth in claim 1, wherein said first and second inclined surfaces are provided between said signal surface and reference surface.

3. A signal transmission device in an intermediate lens barrel as set forth in claim 2, wherein said first inclined surface is formed facing toward the direction of the rotation for connection and said second inclined surface is formed facing toward the direction of the rotation for disconnection.

4. A signal transmission device in an intermediate lens barrel as set forth in claim 1, wherein said movable means includes a rod member slide movable in the direction of the optical axis on said intermediate lens barrel and said signal surface is formed on the top end of said rod member and disposed intersecting said optical axis substantially at right angle, and wherein said movable means further includes means for limiting the slide movement of said rod member so as to prevent said top end from projecting beyond said reference surface.

* * * * *

UNITED STATES PATENT AND TRADEMARK OFFICE
CERTIFICATE OF CORRECTION

PATENT NO. : 4,382,671
DATED : May 10, 1983
INVENTOR(S) : Kunihiro Fukino, et al.

It is certified that error appears in the above-identified patent and that said Letters Patent is hereby corrected as shown below:

Column 4, line 58, delete "now".

Column 6, claim 4, line 3, "slide movable" should read --slidable--.

Signed and Sealed this

Twelfth Day of July 1983

[SEAL]

Attest:

GERALD J. MOSSINGHOFF

Attesting Officer     Commissioner of Patents and Trademarks